United States Patent
Yao et al.

(10) Patent No.: US 7,433,159 B2
(45) Date of Patent: Oct. 7, 2008

(54) MICRO-ACTUATOR UNIT, HEAD GIMBAL ASSEMBLY, AND DISK DRIVE UNIT WITH VIBRATION CANCELLER

(75) Inventors: MingGao Yao, DongGuan (CN); Masashi Shiraishi, HongKong (CN)

(73) Assignee: SAE Magnetics (H.K.) Ltd., Hong Kong (CN)

(*) Notice: Subject to any disclaimer, the term of this patent is extended or adjusted under 35 U.S.C. 154(b) by 588 days.

(21) Appl. No.: 11/050,823

(22) Filed: Jan. 27, 2005

(65) Prior Publication Data

US 2006/0164763 A1    Jul. 27, 2006

(51) Int. Cl.
*G11B 5/56* (2006.01)
(52) U.S. Cl. .................................. 360/294.4
(58) Field of Classification Search .......... 360/294.4, 360/75, 78.12, 234.6, 245.3
See application file for complete search history.

(56) References Cited

U.S. PATENT DOCUMENTS

| | | | |
|---|---|---|---|
| 5,299,081 A | 3/1994 | Hatch et al. | |
| 5,611,707 A | 3/1997 | Meynier | |
| 5,636,089 A | 6/1997 | Jurgenson et al. | |
| 5,898,544 A | 4/1999 | Krinke et al. | |
| 6,198,606 B1 | 3/2001 | Boutaghou et al. | |
| 6,538,836 B1 | 3/2003 | Dunfield et al. | |
| 6,617,763 B2 | 9/2003 | Mita et al. | |
| 6,624,984 B2 | 9/2003 | Lewis et al. | |
| 6,671,131 B2 | 12/2003 | Kasajima et al. | |
| 6,697,211 B2 * | 2/2004 | Koganezawa | 360/78.12 |
| 6,700,727 B1 | 3/2004 | Crane et al. | |
| 6,700,749 B2 | 3/2004 | Shiraishi et al. | |
| 6,747,848 B2 * | 6/2004 | Kasajima et al. | 360/245.3 |
| 6,950,266 B1 | 9/2005 | McCaslin et al. | |
| 6,950,288 B2 * | 9/2005 | Yao et al. | 360/294.4 |
| 7,119,994 B2 * | 10/2006 | Miyano et al. | 360/294.4 |
| 7,199,978 B2 * | 4/2007 | Yao et al. | 360/234.6 |

(Continued)

FOREIGN PATENT DOCUMENTS

JP    2002-74871    3/2002

(Continued)

OTHER PUBLICATIONS

U.S. Appl. No. 11/238,998, filed Sep. 2005, Yang et al.

(Continued)

*Primary Examiner*—Tianjie Chen
(74) *Attorney, Agent, or Firm*—Nixon & Vanderhye P.C.

(57) ABSTRACT

A HGA of the invention includes a slider, a micro-actuator for adjusting the position of the slider; a suspension to load the slider and the micro-actuator; and a vibration canceller interposed between the micro-actuator and the suspension. The micro-actuator includes a first base-part plate, a pair of actuator side arms extending from the first base-part plate in a first direction, and at least one of side arms has a piezoelectric element thereon. The vibration canceller includes a second base-part plate to connect with the micro-actuator and the suspension; and at least one canceling arm extending from the second base-part plate in the first direction or in a second direction, wherein at least one of canceling arms has a piezoelectric element thereon. The invention also discloses a disk drive with the vibration canceller.

15 Claims, 12 Drawing Sheets

U.S. PATENT DOCUMENTS

| | | | |
|---|---|---|---|
| 2003/0002195 A1* | 1/2003 | Sassolini et al. | ............... 360/75 |
| 2003/0147177 A1 | 8/2003 | Yao et al. | |
| 2003/0147181 A1 | 8/2003 | Shiraishi et al. | |
| 2003/0168935 A1 | 9/2003 | Ogawa et al. | |
| 2006/0023338 A1 | 2/2006 | Sharma et al. | |
| 2006/0050442 A1 | 3/2006 | Yao et al. | |
| 2006/0072247 A1 | 4/2006 | Yao et al. | |
| 2006/0082917 A1 | 4/2006 | Yao et al. | |
| 2006/0098347 A1 | 5/2006 | Yao et al. | |
| 2006/0146449 A1 | 7/2006 | Yao et al. | |

FOREIGN PATENT DOCUMENTS

JP  2002-133803  5/2002

OTHER PUBLICATIONS

U.S. Appl. No. 11/169,019, filed Jun. 2005, Yao et al.
U.S. Appl. No. 11/080,659, filed Mar. 2005, Yao et al.
U.S. Appl. No. 11/080,657, filed Mar. 2005, Zhu et al.
U.S. Appl. No. 11/235,549, filed Sep. 2005, Yao et al.
U.S. Appl. No. 11/304,623, filed Dec. 2005, Yao et al.
U.S. Appl. No. 11/169,003, filed Jun. 2005, Yao et al.
U.S. Appl. No. 11/125,248, filed May 2005, Yao et al.
U.S. Appl. No. 11/263,998, filed Nov. 2005, Yao.
U.S. Appl. No. 11/265,385, filed Nov. 2005, Yao et al.
U.S. Appl. No. 11/192,121, filed Jul. 2005, Yao et al.
U.S. Appl. No. 11/304,544, filed Dec. 2005, Yao.
U.S. Appl. No. 11/300,339, filed Dec. 2005, Yao et al.
U.S. Appl. No. 11/385,704, filed Mar. 2006, Yao et al.
U.S. Appl. No. 11/385,698, filed Mar. 2006, Yao et al.
U.S. Appl. No. 11/319,577, filed Dec. 2005, Yao et al.
U.S. Appl. No. 11/353,018, filed Feb. 2006, Yao.
U.S. Appl. No. 11/273,075, filed Nov. 2005, Yao.
U.S. Appl. No. 11/319,580, filed Dec. 2005, Yao et al.
U.S. Appl. No. 11/384,404, filed Mar. 2006, Yao.
U.S. Appl. No. 11/414,546, filed May 2006, Yao et al.
U.S. Appl. No. 11/440,354, filed May 2006, Li.

* cited by examiner

MICRO-ACTUATOR UNIT, HEAD GIMBAL ASSEMBLY, AND DISK DRIVE UNIT WITH VIBRATION CANCELLER

FIELD OF THE INVENTION

The present invention relates to disk drive units, and particularly relates to a micro-actuator unit and a head gimbal assembly with vibration canceller.

BACKGROUND OF THE INVENTION

Disk drives are information storage devices that use magnetic media to store data. Referring to FIG. 1a, a typical disk drive in related art has a magnetic disk and a drive arm to drive a head gimbal assembly 277 (HGA) (the HGA 277 has a suspension (not labeled) with a slider 203 mounted thereon). The disk is mounted on a spindle motor which causes the disk to spin and a voice-coil motor (VCM) is provided for controlling the motion of the drive arm and thus controlling the slider 203 to move from track to track across the surface of the disk to read data from or write data to the disk.

However, because of the inherent tolerance resulting from VCM and the suspension that exists in the displacement (off track) of the slider 203, the slider 203 can not attain a quick and fine position control which will affect the slider 203 to read data from and write data to the magnetic disk.

To solve the above-mentioned problem, piezoelectric (PZT) micro-actuators are now utilized to modify the displacement of the slider 203. That is, the PZT micro-actuator corrects the displacement of the slider 203 on a much smaller scale, and also compensates for the resonance tolerance of the VCM and the suspension. It enables a smaller recording track width, increases the 'tracks per inch' (TPI) value by 50% of the disk drive unit and also can reduce the head seeking and settling time (it is equivalent to increase the surface recording density).

Referring to FIG. 1b, a traditional PZT micro-actuator 205 comprises a ceramic U-shaped frame 297 which comprises two ceramic beams 207 with two PZT pieces (not labeled) on each side thereof. With reference to FIGS. 1a and 1b, the PZT micro-actuator 205 is physically coupled to a suspension 213, and there are three electrical connection balls 209 (gold ball bonding or solder ball bonding, GBB or SBB) to couple the micro-actuator 205 to the suspension traces 210 in each one side of the ceramic beam 207. In addition, there are four metal balls 208 (GBB or SBB) to couple the slider 203 to the suspension traces 210 for electrical connection. FIG. 1c shows a detailed process of inserting the slider 203 into the micro-actuator 205. The slider 203 is bonded with the two ceramic beams 207 at two points 206 by epoxy dots 212 so as to make the motion of the slider 203 dependent of the ceramic beams 207 of the micro-actuator 205.

When power supply is applied through the suspension traces 210, the PZT pieces of the micro-actuator 205 will expand or contract to cause the two ceramic beams 207 of the U-shaped frame 297 deform and then make the slider 203 move on the track of the disk. Thus a fine head position adjustment can be attained.

However, because the PZT micro-actuator 205 are mounted on the suspension tongue (not labeled), when the PZT micro-actuator 205 is excited, it will only do a translational motion to sway the slider 203 above the disk, the sway movement will generate a reaction force exerted to the suspension tongue so as to cause a suspension vibration resonance which has a same resonance as shaking the suspension base plate. This will affect the dynamic performance of the HGA and limit the servo bandwidth and the storage capacity improvement of HDD (hard disk drive). As shown in FIG. 2, numeral 201 represents a resonance curve when shaking the suspension base plate and numeral 202 represents a resonance curve when exciting the micro-actuator 205. Under a frequency of 20K, there are a lot of gain peaks of suspension frequency response in plus side and minus side, which indicate a bad characteristic of resonance. The figure clearly shows the above-mentioned problem.

Hence, it is desired to provide a micro-actuator unit, head gimbal assembly, disk drive to solve the above-mentioned problems.

SUMMARY OF THE INVENTION

A main feature of the present invention is to provide a HGA which can attain a good resonance performance when exciting its micro-actuator unit.

Another feature of the present invention is to provide a micro-actuator unit with vibration canceller.

A further feature of the present invention is to provide a disk drive unit with big servo bandwidth and storage capacity.

To achieve the above-mentioned features, a HGA of the present invention comprises a slider; a micro-actuator for adjusting the position of the slider; wherein the micro-actuator comprising a first base-part plate, a pair of actuator side arms extending from the first base-part plate in a first direction, and at least one of side arms has a PZT element thereon; a suspension to load the slider and the micro-actuator; and a vibration canceller interposed between the micro-actuator and the suspension.

In an embodiment, the vibration canceller comprises a second base-part plate to connect with the micro-actuator and the suspension; and at least one canceling arm extending from the second base-part plate in the first direction or in a second direction, wherein at least one of canceling arms has a PZT element thereon. The first direction and the second direction are perpendicular to the second base-part plate. In another embodiment, the vibration canceller has two canceling arms extending from the second base-part plate in the first direction or in the second direction; and both the canceling arms have their free ends connected with each other. In a further embodiment, the vibration canceller has a single canceling arm extending from the second base-part plate in the first direction or in the second direction; and the single canceling arm extends from a middle portion or a side portion of the second base-part plate.

In the present invention, a first parallel gap is formed between the micro-actuator and the vibration canceller, and a second parallel gap exists between the suspension and the at least one canceling arm. The at least one PZT elements are thin film PZT elements or ceramic PZT elements. Each of the at least one PZT elements have a single-layer structure or a multi-layer structure.

A micro-actuator unit of the present invention comprises a micro-actuator for adjusting the position of the slider; wherein the micro-actuator comprising a first base-part plate, a pair of actuator side arms extending from the first base-part plate in a first direction, and at least one of side arms has a PZT element thereon; and a vibration canceller connected with the micro-actuator. In the present invention, the vibration canceller comprises a second base-part plate to connect with the micro-actuator; and at least one canceling arm extending from the second base-part plate in the first direction or in a second direction, wherein at least one of canceling arms has a piezoelectric element thereon.

A disk drive unit of the present invention comprises a HGA; a drive arm to connect with the HGA; a disk; and a spindle motor to spin the disk. The HGA comprises a slider; a micro-actuator to adjust the position of the slider; a suspension to load the slider and the micro-actuator; and a vibration canceller interposed between the micro-actuator and the suspension. The micro-actuator comprising a first base-part plate, a pair of actuator side arms extending from the first base-part plate in a first direction, and at least one of side arms has a PZT element thereon. The vibration canceller comprises a second base-part plate to connect with the micro-actuator and the suspension; and at least one canceling arm extending from the second base-part plate in the first direction or in a second direction, wherein at least one of canceling arms has a PZT element thereon.

Compared with the prior art, the present invention provides a vibration canceller between the micro-actuator and the suspension, so when the micro-actuator is excited and do a movement, a first reaction force resulting therefrom will be transferred to the vibration canceller, then the vibration canceller is also being excited and self-generating another opposition reaction force to counteract the first reaction force. Thus, no additional force will be exerted to the suspension and accordingly suspension vibration resonance due to operating the micro-actuator can be cancelled. In addition, because suspension resonance has been cancelled in a low frequency, but only a micro-actuator resonance happened in a high frequency, this would enlarge the servo bandwidth and then improve the capacity of the HDD.

For the purpose of making the invention easier to understand, several particular embodiments thereof will now be described with reference to the appended drawings in which:

DESCRIPTION OF THE DRAWINGS

FIG. 1b is an enlarged, partial view of FIG. 1a;

FIG. 1c shows a detailed process of inserting a slider to a micro-actuator of the HGA in FIG. 1a;

FIG. 2 shows a resonance curve of the HGA of FIG. 1a;

DETAILED DESCRIPTION OF THE INVENTION

Figure 1A:
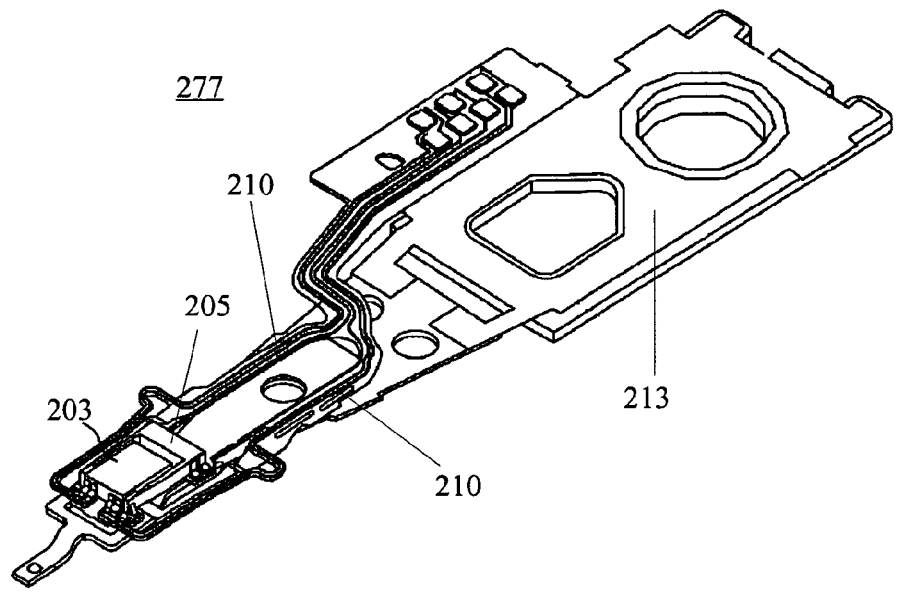
FIG. 1a is a perspective view of a HGA of related art.
Figure 1B:
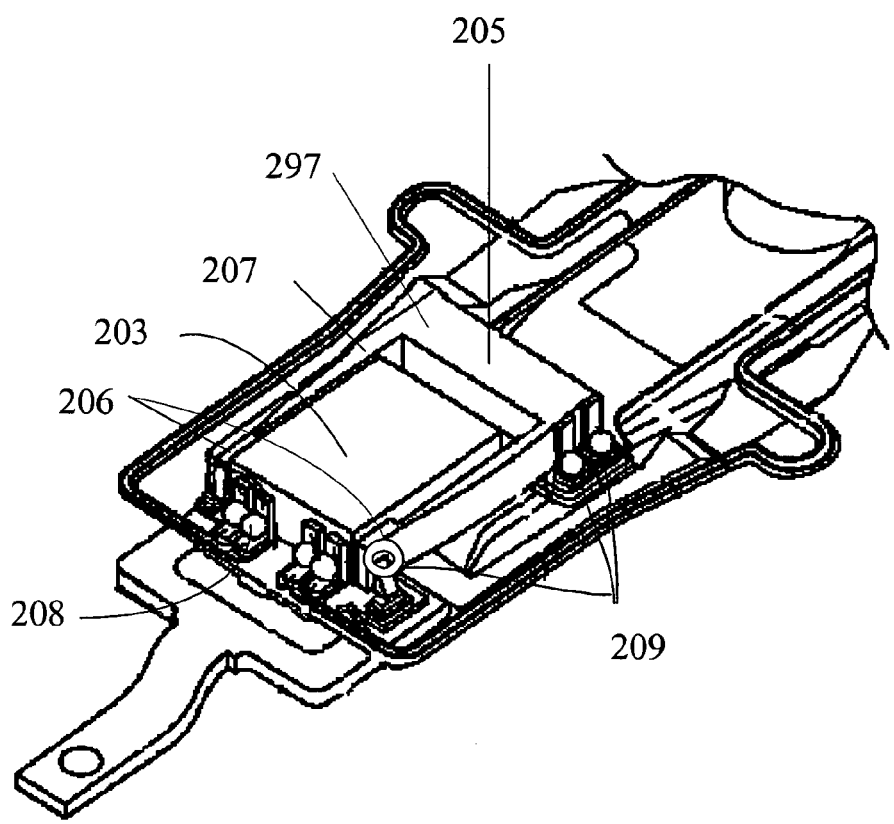
Figure 1C:
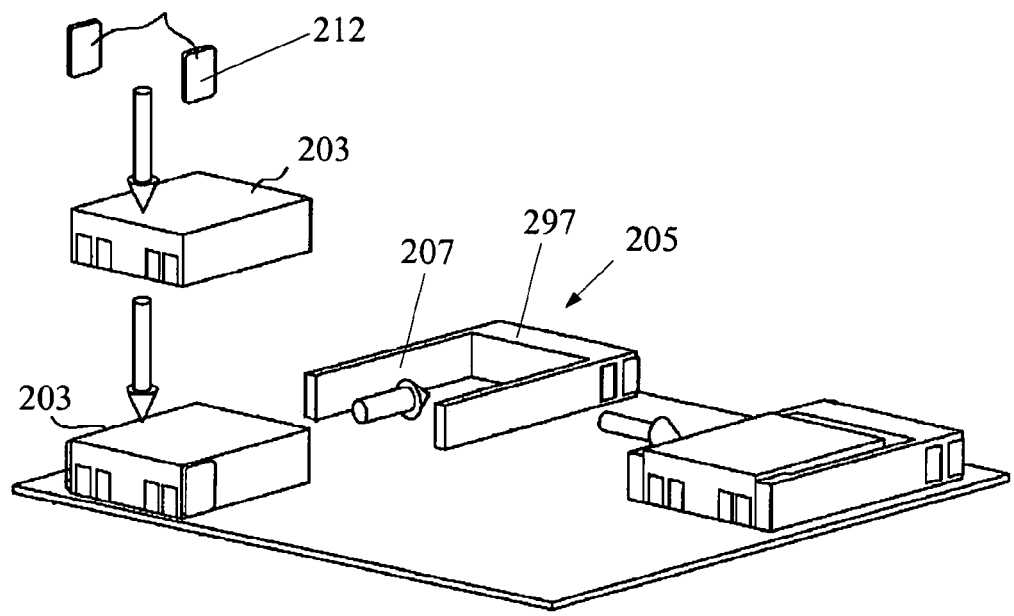
Figure 2:
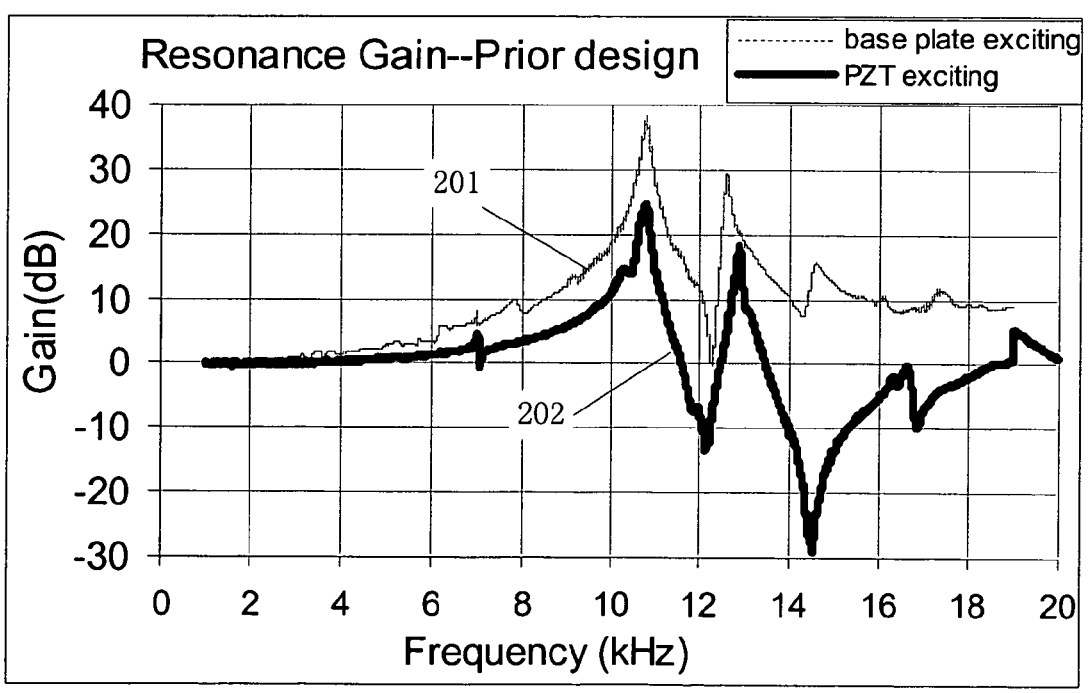
Figure 3:
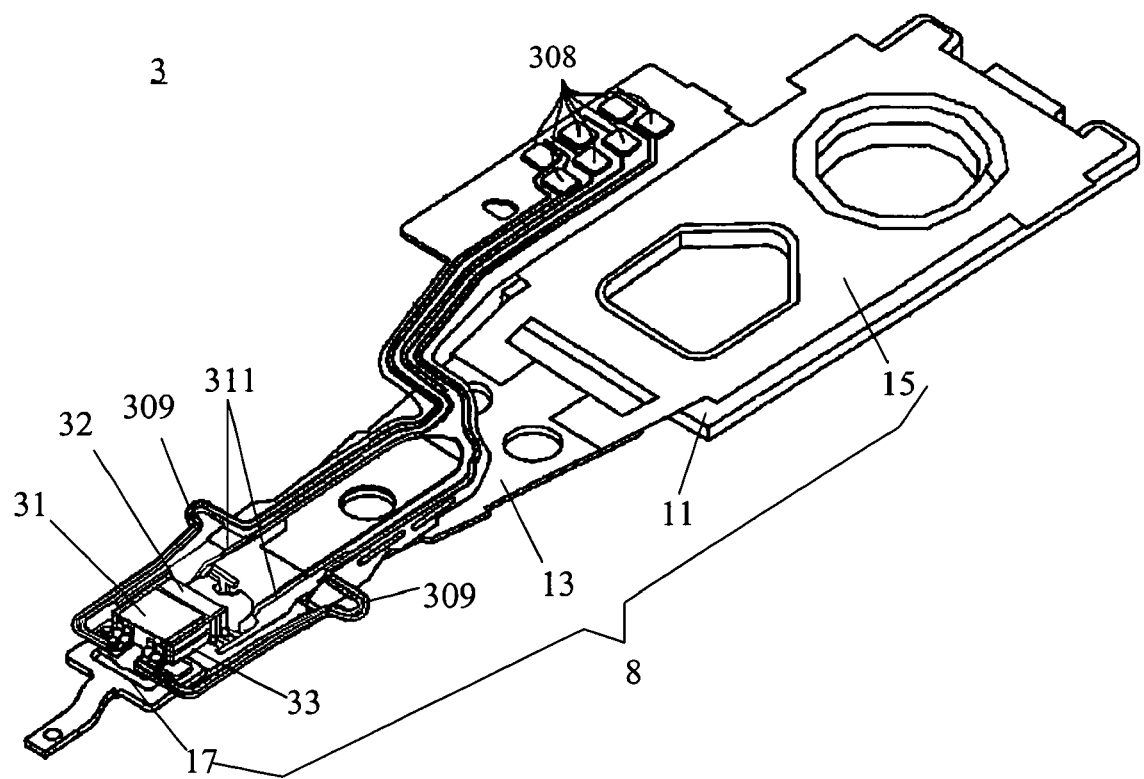
FIG. 3 is a perspective view of a HGA according to a first embodiment of the present invention.

Referring to FIG. 3, a head gimbal assembly (HGA) 3 of the present invention comprises a slider 31, a micro-actuator 32 and a suspension 8 to load the slider 31 and the micro-actuator 32. The HGA 3 further comprises a vibration canceller 33 interposed between the micro-actuator 32 and the suspension 8.

Figure 4:
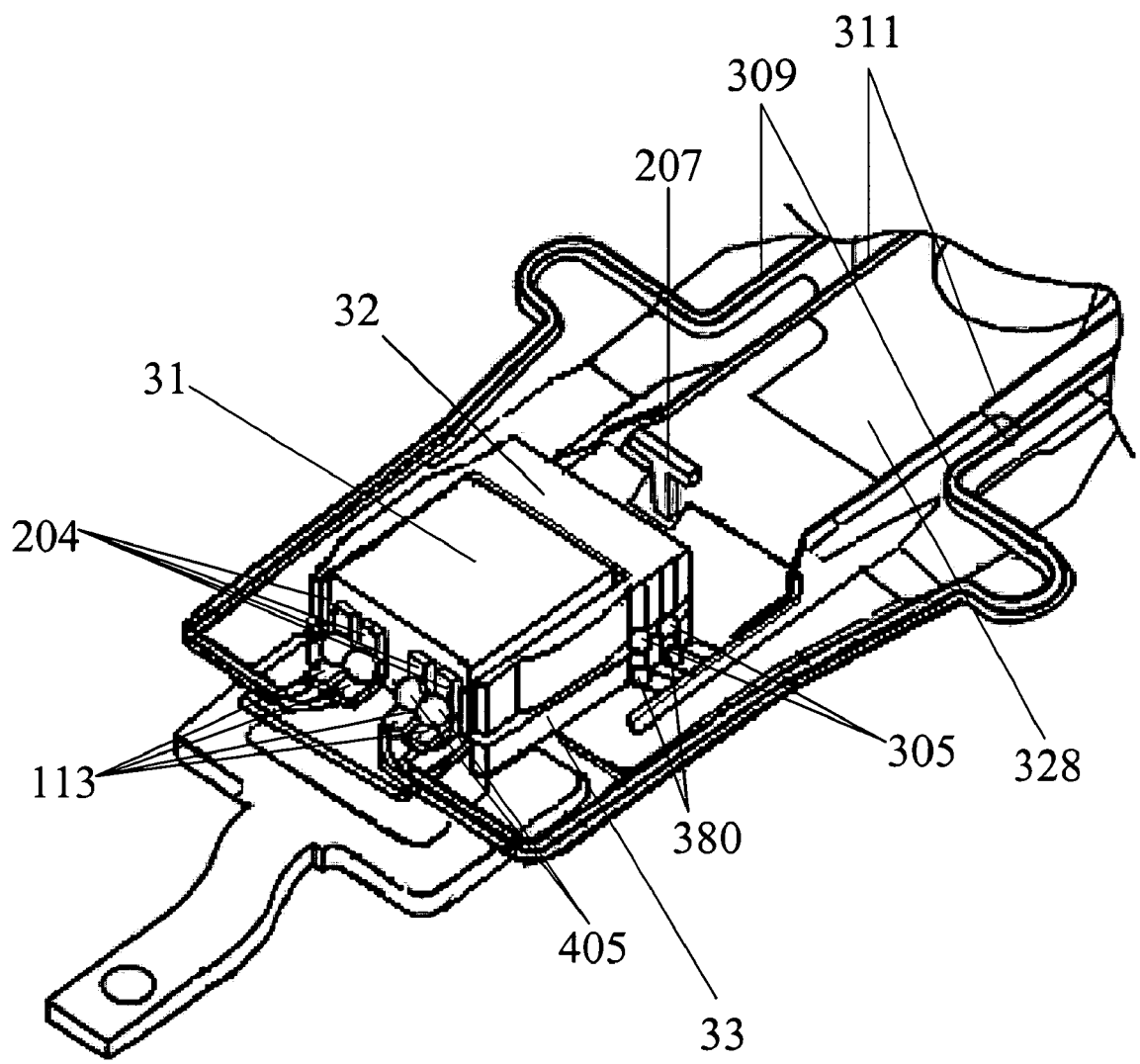
FIG. 4 is an enlarged, partial perspective view of the HGA of FIG. 3.
Figure 5:
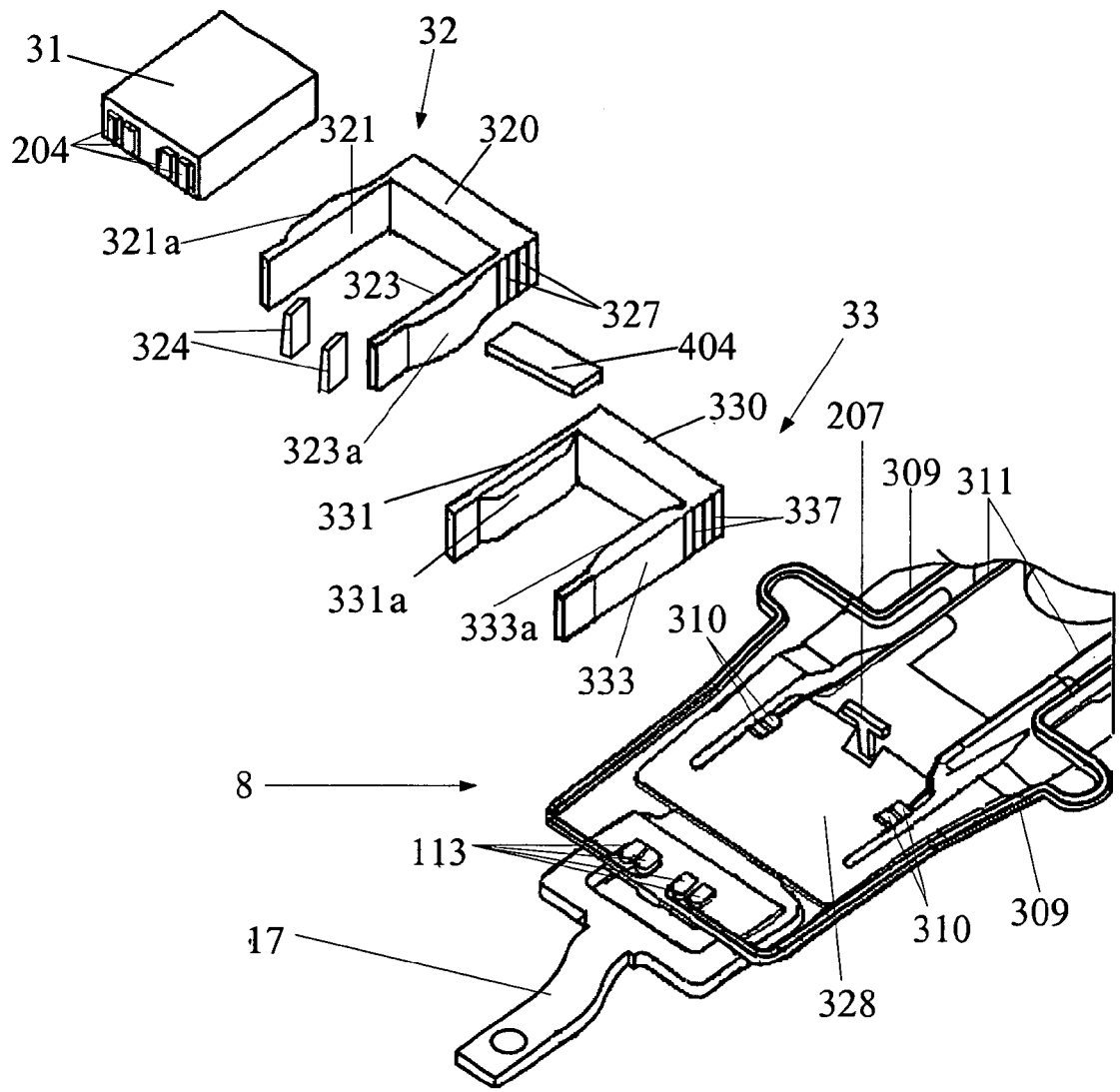
FIG. 5 is an exploded view of FIG. 4.
Figure 6:
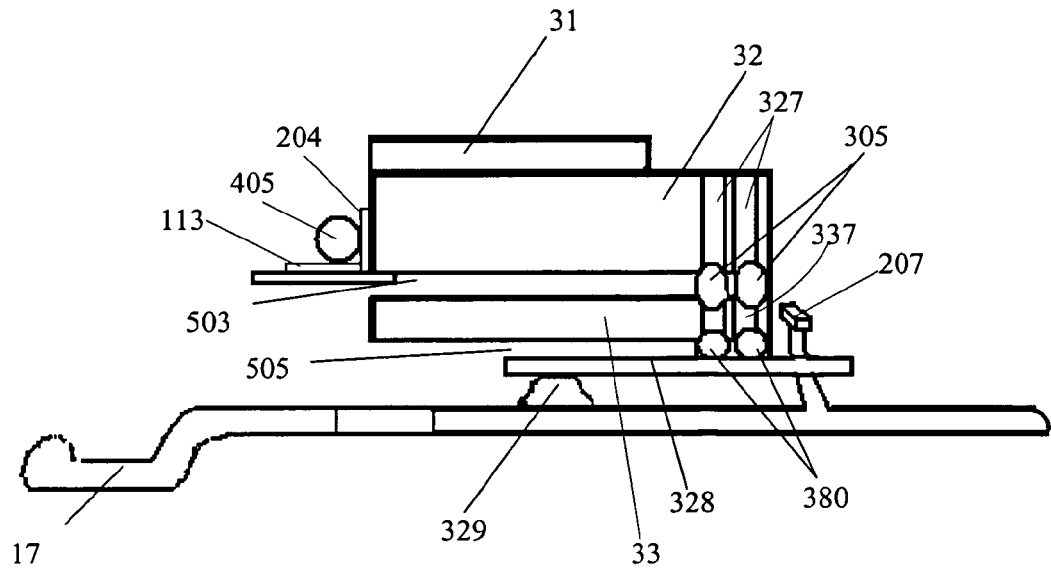
FIG. 6 is a partial, side view of the HGA of FIG. 3 in micro-actuator area.

Also referring to FIG. 3, the suspension 8 comprises a load beam 17, a flexure 13, a hinge 15 and a base plate 11. On the flexure 13 a plurality of connection pads 308 are provided to connect with a control system (not shown) at one end and a plurality of electrical multi-traces 309, 311 is provided in the other end. Referring to FIGS. 4 and 5, the flexure 13 also comprises a suspension tongue 328 which are used to support the vibration canceller 33, micro-actuator 32 and the slider 31. Referring to FIG. 6, the load beam 17 has a dimple 329 formed thereon to support the suspension tongue 328.

Referring to FIGS. 3-5, a limiter 207 is formed on the load beam 17 which extends through the suspension tongue 328 for preventing the suspension tongue 328 from being bent overly during normal operation of disk drive or any shock or vibration happening to the disk drive. The suspension tongue 328 has a plurality of electrical bonding pads 113 and 310 formed thereon. The slider 31 has a plurality of electrical bonding pads 204 on an end thereof corresponding to the electrical bonding pads 113 of a moving part of the suspension tongue 328.

In the present invention, referring to FIGS. 3-5, the micro-actuator 32 comprises a U-shaped frame which having two side beams 321, 323 and a bottom beam 320 to connect with the two side beams 321, 323. Each of the side beams 321, 323 has at least one PZT piece, such as PZT piece 321a or 323a bonded thereon, and also has a plurality of electrical bonding pads 327 corresponding to the suspension electrical bonding pads 310 (see FIG. 5). In an embodiment, the PZT pieces 321a is bonded to an outer side of the side beams 321, and the PZT pieces 323a is bonded to an outer side of the side beams 323.

In the present invention, the vibration canceller 33 comprises a frame and at least one piezoelectric piece to be bonded with the frame. The frame is bonded with the micro-actuator 32 and the suspension 8.

Referring to the FIG. 5, according to a first embodiment of the invention, the frame is also a U-shaped frame which comprises two side plates 331, 333 and a bottom plate 330 to connect with the two side plates 331, 333. When the frame is bonded with micro-actuator 32, the side beams 321, 323 extending from the bottom beam 320 in a first direction while the side plate 331, 333 extending from the bottom plate 330 in an same direction as the first direction. Each of the side plates 331, 333 has a plurality of electrical bonding pads 337 corresponding to the electrical bonding pads 310. The U-shaped frame can be made of metal (i.e. stainless steel), ceramic, silicon or polymer. Two PZT pieces 331a, 333a are respectively bonded on the side plates 331, 333 by traditional bonding method, such as epoxy bonding, anisotropic conductive film (ACF). In an embodiment, the PZT pieces 331a is bonded to an inner side of the side plates 331, and the PZT pieces 333a is bonded to an inner side of the side plates 333.

Figure 4A:
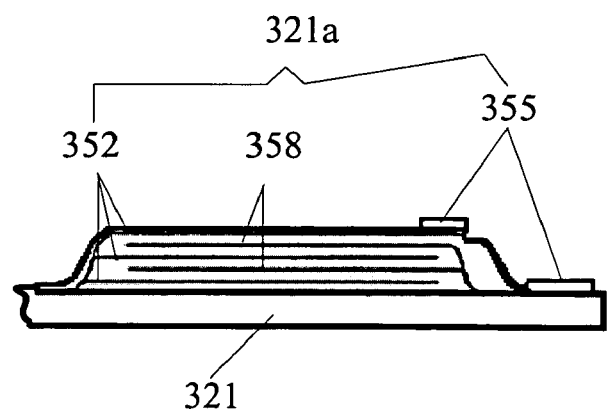
FIG. 4a is an enlarged, partial, cross-sectional view of a PZT piece of the HGA of FIG. 4.

The PZT pieces 321a, 323a, 331a, 333a are preferably made of thin film PZT material which can be a single-layer PZT element or a multi-layer PZT element. Also, the PZT pieces 321a, 323a, 331a, 333a can be made of ceramic PZT material which can be a single-layer PZT element or a multi-layer PZT element. Referring to FIG. 4a, as an embodiment, the PZT piece 321a has a multi-layer structure, which has two kinds of electrodes 352 and 358 laminated alternatively, and in one end the two kinds of electrodes 352, 358 are connected with two electrical pads 355, respectively. In an embodiment, the PZT pieces 321a, 323a, 331a, 333a have a single-segment structure or a multi-segment structure.

Also referring to FIGS. 3-5, in an embodiment of the present invention, the slider 31 is partially coupled with the two side beams 321, 323 at two points (not labeled) by two epoxy dots 324. The micro-actuator 32 is bonded with the vibration canceller 33 by using epoxy 404 to bond the bottom beam 320 with the bottom plate 330. The vibration canceller 33 is partially coupled with the suspension tongue 328 of the flexure 13 through the bottom plate 330 thereof by ACF, adhesive or epoxy. Then, a plurality of metal balls 305 (GBB, SBB or conductive adhesive) are used to electrically connect the electrical bonding pads 327 of the micro-actuator 32 with the electrical bonding pads 337 of the vibration canceller 33; simultaneously, a plurality of metal balls 380 (GBB, SBB or conductive adhesive) are used to electrically connect the electrical bonding pads 337 of the vibration canceller 33 with the electrical bonding pads 310 of the suspension tongue 328. Thus the micro-actuator 32, the vibration canceller 33 are electrically connected with the two electric multi-traces 311 of the suspension 8. In addition, a plurality of metal balls 405 are used to electrically connect the electrical bonding pads 204 of the slider 31 with the electrical bonding pads 113 of the moving part of the suspension tongue 328 so as to electrically connect the slider 31 with the electric multi-traces 309. Through the electric multi-traces 309, 311, the connection pads 308 electrically connect the slider 31 and the micro-actuator 32 with the control system (not shown).

In the present invention, referring to FIG. 6, a parallel gap 505 is formed between the vibration canceller 33 and the suspension tongue 328 so as to assure a free movement of the vibration canceller 33. In addition, there is also a parallel gap 503 formed between the micro-actuator 32 and the vibration canceller 33. Here, because the slider 31 has a partial bonding method with the two side beams 321, 323 and the parallel gap 503 formed between the micro-actuator 32 and the vibration canceller 33, the slider 31 will move freely when being driven by the micro-actuator 32.

Figure 7A:
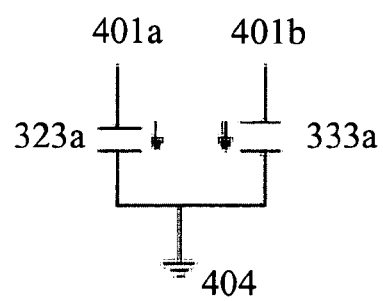
FIG. 7a shows an electrical connection relationship of two PZT pieces of the HGA of FIG. 3, which have a same polarization direction according to an embodiment of the present invention.

Taking injunction with FIGS. 7a-7e, the following gives a detail description of how the vibration canceller works. FIG. 7a shows that an electrical connection relationship between the two PZT pieces 323a, 333a, which are positioned adjacent to a same side of the suspension tongue 328. In an embodiment, referring to FIG. 7a, the two PZT pieces 323a, 333a have a same polarization direction, which are common grounded by one end 404 and the other ends 401a and 401b thereof are applied two voltages with a same sine waveform 407 (see FIG. 7d). When the sine voltage 407 is applied to the two PZT pieces 323a, 333a, in a first half period, both PZT pieces 323a, 333a will contract with the drive voltage increasing, and then gradually spring back till to its original location with the drive voltage reducing. Because the PZT piece 323a is bonded on the outer side of the side beam 323, the side beam 323 will be bent to outer side and accordingly a reaction force F1 will be generated on the bottom beam 320. The reaction force F1 will immediately be transferred to the canceller bottom plate 330 because the bottom beam 320 of the micro-actuator 32 is bonded with the bottom plate 330 of the vibration canceller 33. At the same time, the side plate 333 will be bent to inner side because the PZT pieces 333a is bonded on the inner side of the side plate 333. A reaction force F2 will be generated on the bottom plate 330 of the vibration canceller 33. Here, the reaction force F1 and F2 are controlled to have opposition directions and a same value, so the resultant force exerted to the bottom plate 330 is zero. Understandably, the suspension 8 will not be influenced by motion of the side beam 323. When the sine voltage 407 goes down to a second half period (having an opposed phase with the first half period), both PZT pieces 323a, 333a will expand with the drive voltage increasing and then back to its original position with the drive voltage reducing. Accordingly, both the reaction force F1 and F2 change their directions and the resultant force exerted to the bottom plate 330 is still zero. The PZT pieces 321a, 331a have a same work principle with the PZT pieces 323a, 333a, thus a detailed description is omitted herefrom.

Figure 7B:
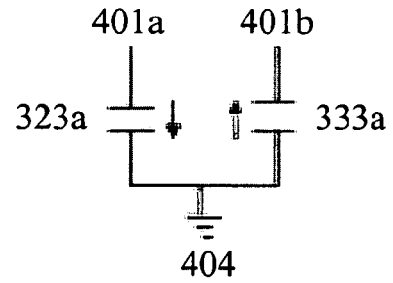
FIG. 7b shows an electrical connection relationship of two PZT pieces of the HGA of FIG. 3, which have opposing polarization directions according to another embodiment of the present invention.
Figures 7C, 7D:
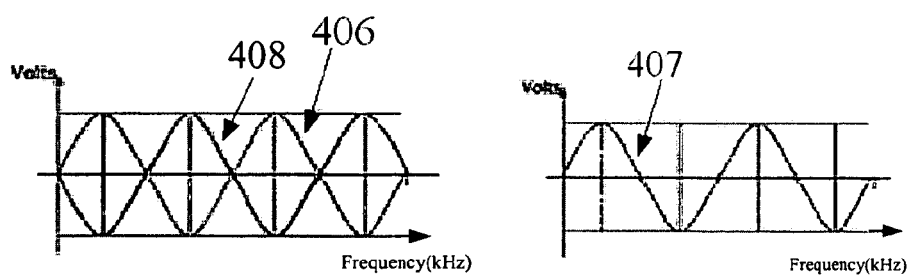
FIG. 7c shows two waveforms of voltages which are applied to the two PZT pieces of FIG. 7b, respectively.
FIG. 7d shows a waveform of voltage which is applied to the two PZT pieces of FIG. 7a, respectively.
Figure 7E:
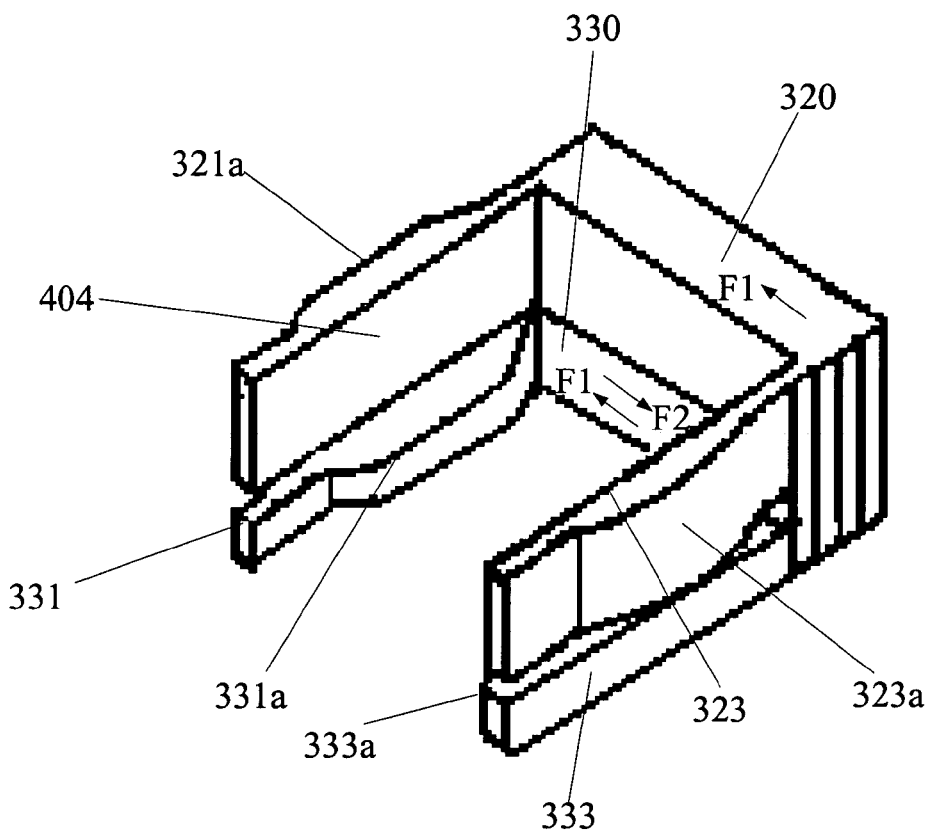
FIG. 7e shows a view to show working principle of a vibration canceller of the HGA of FIG. 3.

According to another embodiment of the invention, the two PZT pieces 321a, 331a have two opposing polarization directions, as shown in FIG. 7b, which are also common grounded by one end 404 and the other ends 401a and 401b thereof are applied two voltages with different phase waveforms 406, 408 (see FIG. 7c). Under the drive of the voltages, both PZT pieces 321a, 331a will contract gradually and then back to its initial position during a same half period, and when the voltages go to next half period, both PZT pieces 321a, 331a will expand gradually and then back to its initial position. Similarly, the reaction force F1 and F2 will be generated and the resultant force exerted to the bottom plate 330 is still zero.

Figure 8A:
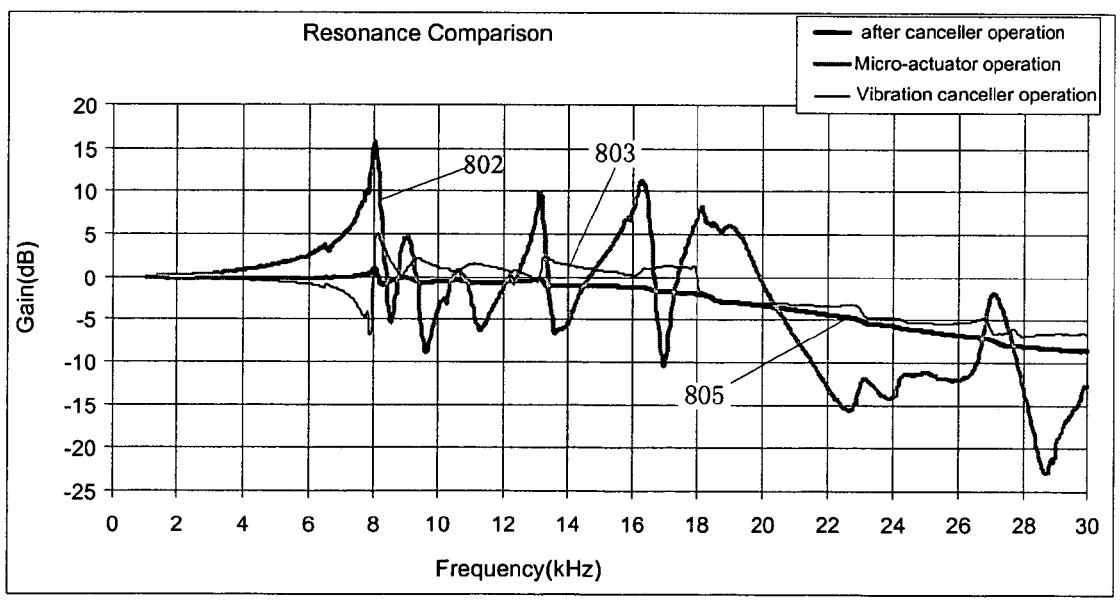
FIGS. 8a and 8b are comparison resonance curves of the HGA of FIG. 3.
Figure 8B:
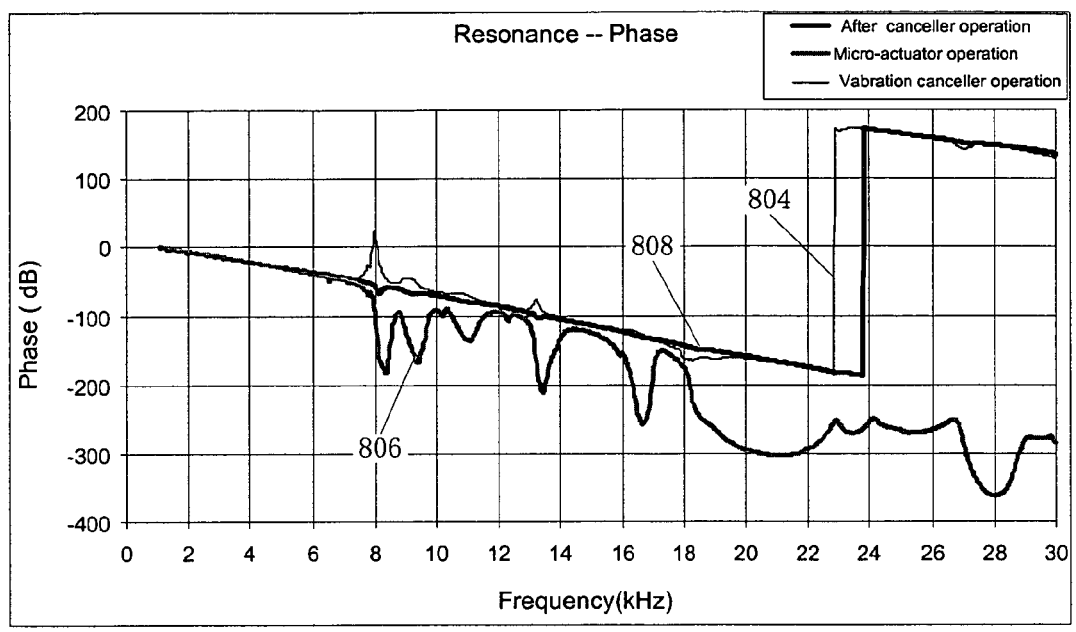

FIGS. 8a and 8b show a testing result of the resonance performance of the HGA of the invention. Here, numeral 802 shows a micro-actuator operation resonance curve, which has a phase curve 806, and numeral 803 show a resonance curve of vibration canceller operation, which has an opposed phase curve 804. With the help of the vibration canceller 33, the vibration of the suspension 8 is cancelled. Numeral 805 shows a resonance gain curve of the HGA of the invention and numeral 808 shows a phase curve thereof. It also shows that a suspension resonance has not happened in a low frequency, this would enlarge the servo bandwidth and improve the capacity of the HDD, reduce the slider seeking and settling time.

Figure 9A:
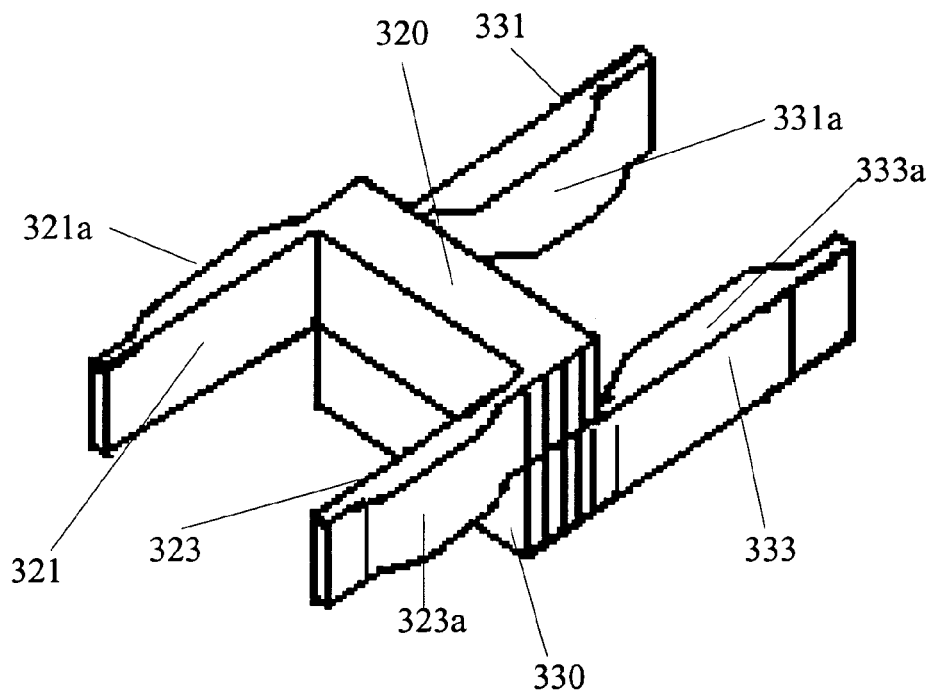
FIGS. 9a-9g are perspective views of the vibration canceller according to seven different embodiments of the invention.

According to a second embodiment of the invention, referring to FIG. 9a, the micro-actuator 32 and the vibration canceller 33 can be bonded together as the following status: the side beams 321, 323 extending from the bottom beam 320 in a first direction while the side plate 331, 333 extending from the bottom plate 330 in an opposite direction to the first direction.

Figure 9B:
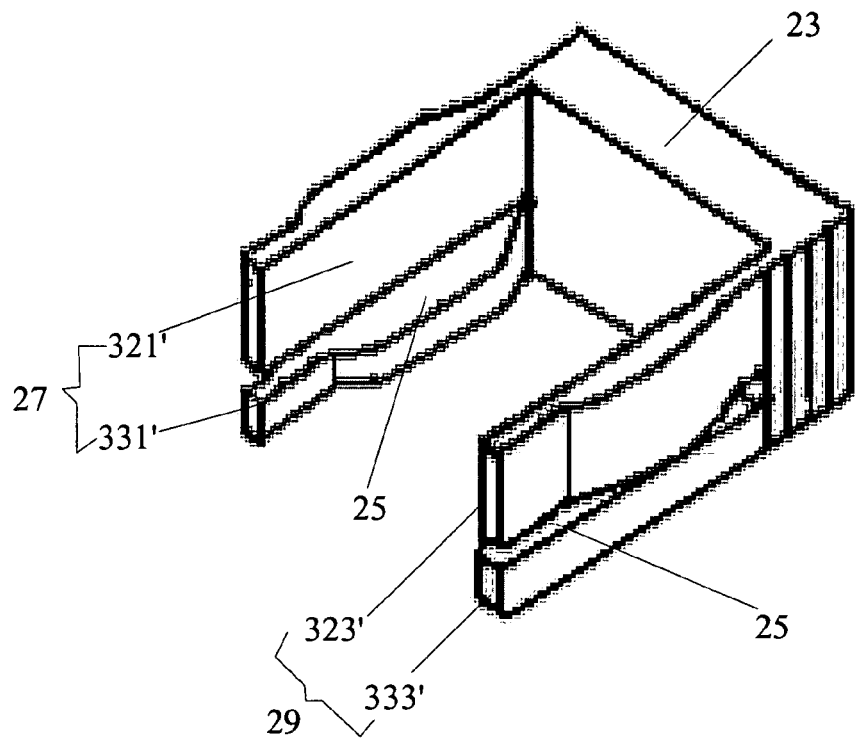

According to a third embodiment of the invention, referring to FIG. 9b, the frames of the micro-actuator 32 and the vibration canceller 33 can be integrally formed as a frame which has an integral bottom plate 23, and two side plates 27, 29. Two gaps 25 are respectively formed in the two side plates 27, 29, and thus divided the side plate 27 as a first side plate 321' and a second side plate 331', and divided the side plate 29 as a first side plate 323' and a second side plate 333'.

Figure 9C:
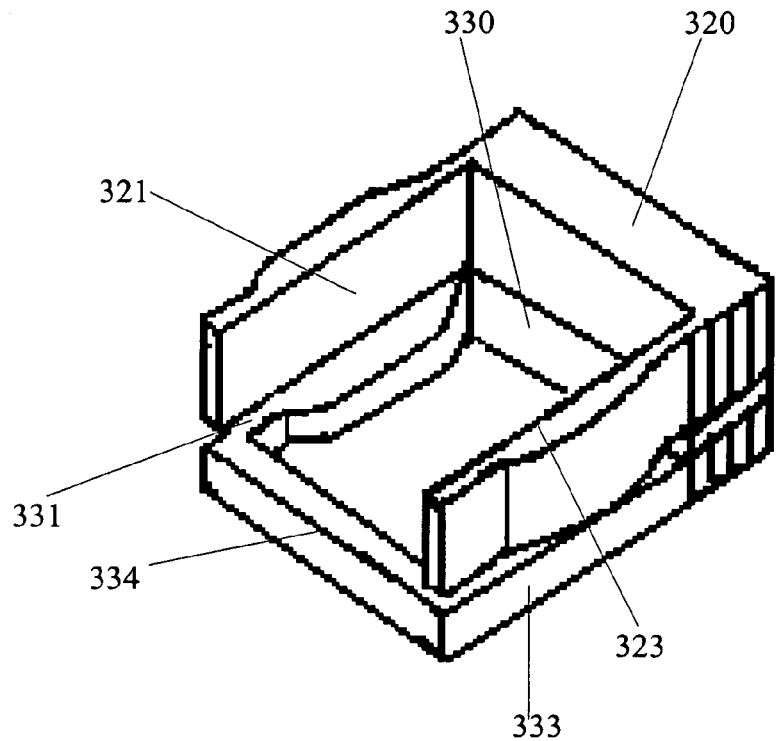
Figure 9D:
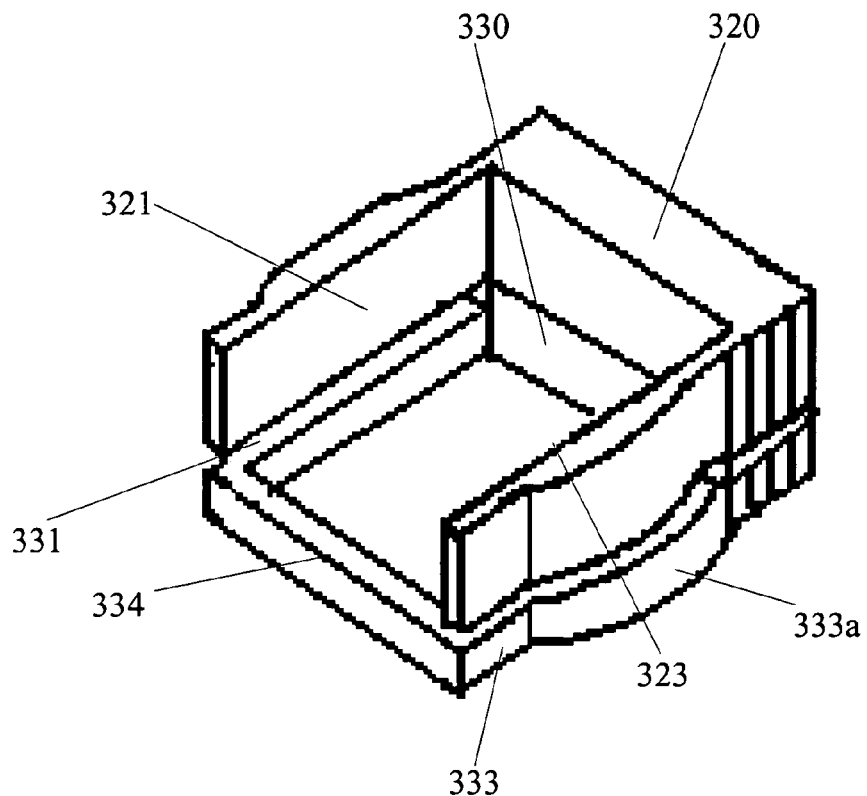

According to a fourth embodiment of the invention, referring to FIG. 9c, the frame of the vibration canceller 33 may further comprise a top plate 334 to connect with the two side plates 331, 333. In a five embodiment, referring to FIG. 9d, the two PZT pieces 333a may be bonded to outer side of the side plates 331, 333.

Figure 9E:
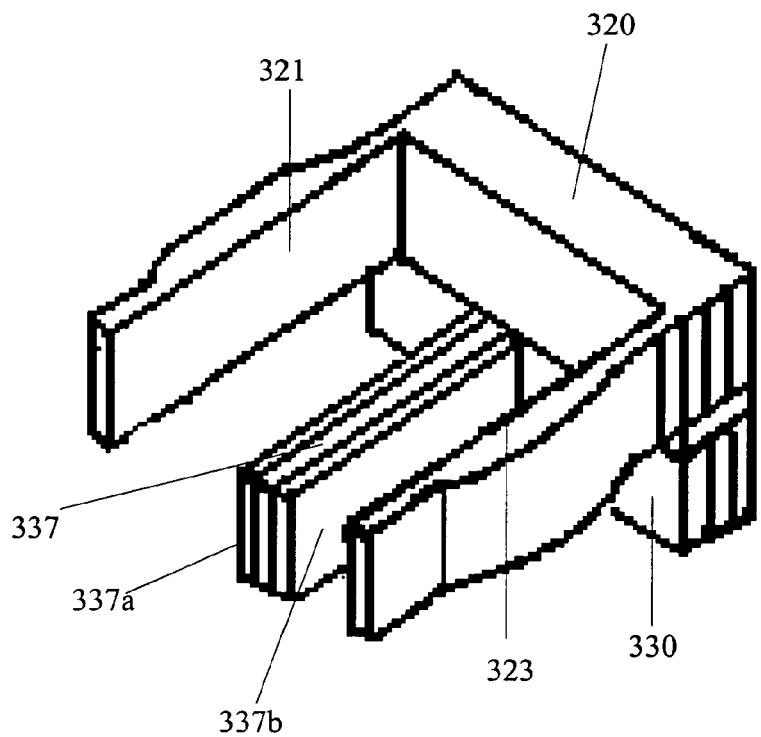
Figure 9F:
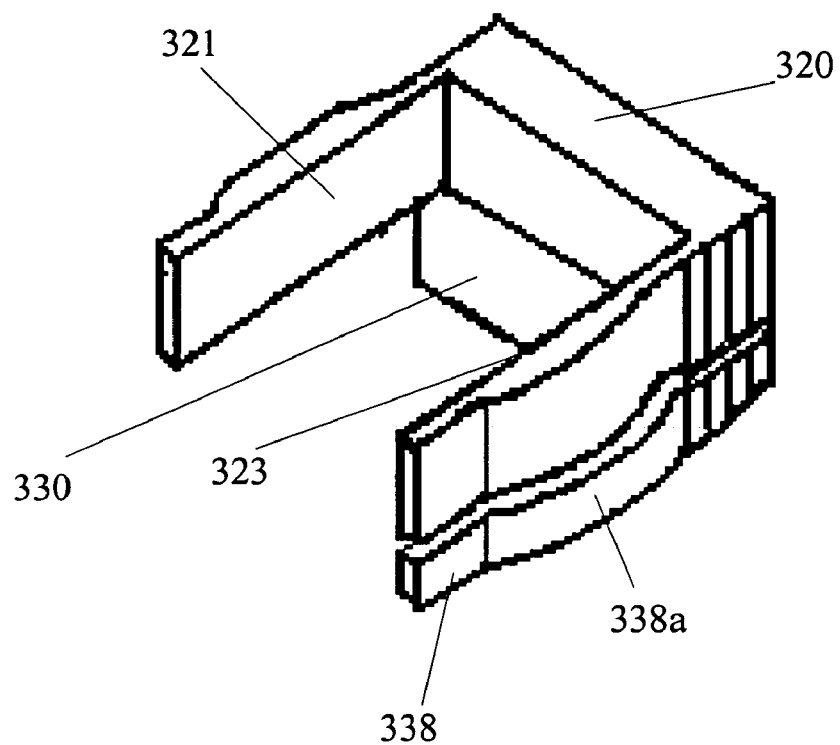

According to a six embodiment of the invention, referring to FIG 9e, the vibration canceller 33 may have a frame comprising a bottom plate 330 and a single side plate 337 which extending from a middle portion of the bottom plate 330. Two PZT pieces 337a, 337b are bonded to both sides of the side plate 337. According to a seven embodiment of the invention, referring to FIG. 9f, the vibration canceller 33 may have a frame comprising a bottom plate 330 and a single side plate 338 which extending from an end portion of the bottom plate 330. Two PZT pieces 338a are bonded to both sides of the side plate 338.

Figure 9G:
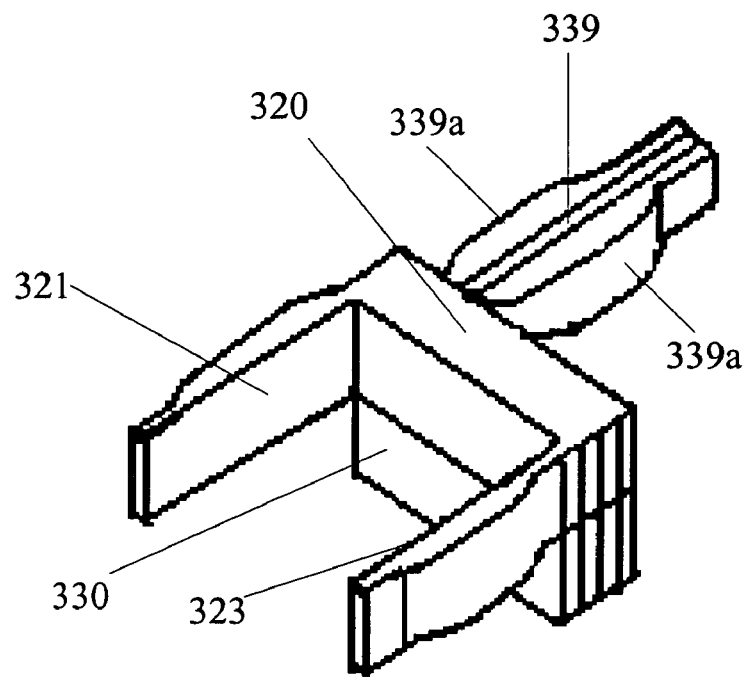

According to an eight embodiment of the invention, referring to FIG. 9g, the vibration canceller 33 has a frame comprising a bottom plate 330 and a single side plate 339 which extending from an end portion of the bottom plate 330. Two PZT pieces 339a are bonded to both sides of the side plate 339. The vibration canceller 33 is bonded with the micro-actuator 32 by bonding the bottom beam 320 with the bottom plate 330, at the time, the side beams 321, 323 extends from the bottom beam 320 in a first direction while the side plate 339 extending from the bottom plate 330 in an opposite direction to the first direction. The above-mentioned embodiments have a similar work principle with the first embodiment, a detailed description thereof is thus omitted.

Compared with the prior art, the present invention provides a vibration canceller between the micro-actuator and the suspension, so when the micro-actuator is excited and do a movement, a first reaction force resulting therefrom will be transferred to the vibration canceller, which self-generating an opposition reaction force to counteract the first reaction force. Thus, no additional force will be exerted to the suspension and accordingly suspension vibration and suspension resonance can be cancelled. In addition, because suspension resonance has been cancelled in a low frequency when operating the micro-actuator, and only a micro-actuator resonance happened in a high frequency, this would enlarge the servo bandwidth and then improve the storage capacity of the HDD.

Figure 10:
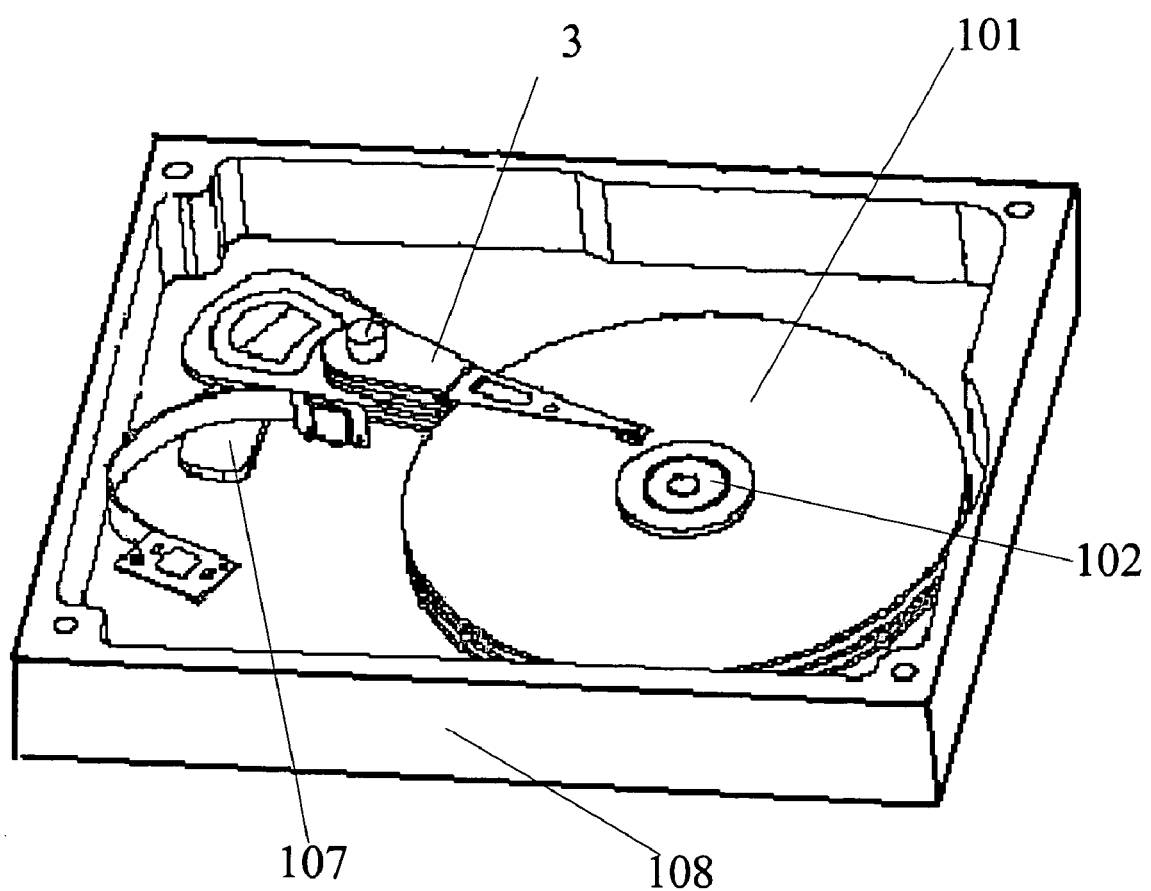
FIG. 10 is perspective view of a disk drive unit according to an embodiment of the invention.

In the present invention, referring to FIG. 10, a disk drive unit with vibration canceller of the present invention can be attained by assembling a housing 108, a disk 101, a spindle motor 102, a VCM 107 with the HGA 3 of the present invention. Because the structure and/or assembly process of disk drive unit of the present invention are well known to persons ordinarily skilled in the art, a detailed description of such structure and assembly is omitted herefrom.

What is claimed is:

1. A head gimbal assembly comprising:
   a slider;
   a micro-actuator for adjusting the position of the slider, wherein the micro-actuator comprises a first base-part plate, a pair of actuator side arms extending from the first base-part plate in a first direction, at least one of the actuator side arms having a piezoelectric element thereon;
   a suspension to load the slider and the micro-actuator;
   a vibration canceller interposed between the micro-actuator and the suspension;
   a second base-part plate to connect with the micro-actuator and the suspension;
   at least one canceling arm extending from the second base-part plate in the first direction or in a second direction, wherein at least one of the canceling arms has at least one piezoelectric element thereon.

2. The head gimbal assembly as claimed in claim 1, wherein the first direction and the second direction are perpendicular to the second base-part plate.

3. The head gimbal assembly as claimed in claim 1, wherein the vibration canceller has two canceling arms extending from the second base-part plate in the first direction or in the second direction; and both the canceling arms have their free ends connected with each other.

4. The head gimbal assembly as claimed in claim 1, wherein the vibration canceller has a single canceling arm extending from the second base-part plate in the first direction or in the second direction; and the single canceling arm extends from a middle portion or a side portion of the second base-part plate.

5. The head gimbal assembly as claimed in claim 1, wherein a first parallel gap is formed between the micro-actuator and the vibration canceller, and a second parallel gap exists between the suspension and the at least one canceling arm.

6. The head gimbal assembly as claimed in claim 1, wherein the at least one piezoelectric elements are thin film piezoelectric elements or ceramic piezoelectric elements.

7. The head gimbal assembly as claimed in claim 1, wherein each of the at least one piezoelectric elements have a single-layer structure or a multi-layer structure.

8. micro-actuator unit comprising:
   a micro-actuator for adjusting the position of a slider, wherein the micro-actuator comprises a first base-part plate, a pair of actuator side arms extending from the first base-part plate in a first direction, at least one of the actuator side arms having a piezoelectric element thereon; and
   a vibration canceller connected with the micro-actuator, the vibration canceller comprising:
      a second base-part plate to connect with the micro-actuator, and
      at least one canceling arm extending from the second base-part plate in the first direction or in a second direction, wherein at least one of canceling arms has at least one piezoelectric element thereon.

9. The micro-actuator unit as claimed in claim 8, wherein the first direction and the second direction are perpendicular to the second base-part plate.

10. The micro-actuator unit as claimed in claim 8, wherein the vibration canceller has two canceling arms extending from the second base-part plate in the first direction or in the second direction; and both the canceling arms have their free ends connected with each other.

11. The micro-actuator unit as claimed in claim 8, wherein the vibration canceller has a single canceling arm extending from the second base-part plate in the first direction or in the second direction; and the single canceling arm extends from a middle portion or a side portion of the second base-part plate.

12. The micro-actuator unit as claimed in claim 8, wherein a parallel gap is formed between the micro-actuator and the vibration canceller.

13. The micro-actuator unit as claimed in claim 8, wherein the at least one piezoelectric elements are thin film piezoelectric elements or ceramic piezoelectric elements.

14. The micro-actuator unit as claimed in claim 8, wherein each of the at least one piezoelectric elements have a single-layer structure or a multi-layer structure.

15. A disk drive unit comprising:
   a head gimbal assembly;
   a drive arm to connect with the head gimbal assembly;
   a disk; and
   a spindle motor to spin the disk,
   wherein the head gimbal assembly comprises a slider and a micro-actuator to adjust the position of the slider,
   wherein the micro-actuator comprises:

a first base-part plate, a pair of actuator side arms extending from the first base-part plate in a first direction, at least one of the actuator side arms having a piezoelectric element thereon, a suspension to load the slider and the micro-actuator; and a vibration canceller interposed between the micro-actuator and the suspension, amd wherein the vibration canceller comprises:

a second base-part plate to connect with the micro-actuator and the suspension;

at least one canceling arm extending from the second base-part plate in the first direction or in a second direction, wherein at least one of canceling arms has a piezoelectric element thereon.

* * * * *